US008893099B1

(12) United States Patent
Leung

(10) Patent No.: US 8,893,099 B1
(45) Date of Patent: Nov. 18, 2014

(54) INNER FUNCTION LOCAL VARIABLE NAME SHADOWING

(75) Inventor: Alan Leung, Mountain View, CA (US)

(73) Assignee: Google Inc., Mountain View, CA (US)

( * ) Notice: Subject to any disclaimer, the term of this patent is extended or adjusted under 35 U.S.C. 154(b) by 224 days.

(21) Appl. No.: 13/307,959

(22) Filed: Nov. 30, 2011

(51) Int. Cl.
*G06F 9/45* (2006.01)

(52) U.S. Cl.
USPC .......... 717/151

(58) Field of Classification Search
USPC .......... 717/151
See application file for complete search history.

(56) References Cited

U.S. PATENT DOCUMENTS 6,102,966 A * 8/2000 Tyma .......... 717/110
7,592,930 B1 9/2009 Ager et al.
7,987,458 B2 7/2011 Rothman et al.
2009/0271771 A1* 10/2009 Fallows .......... 717/137

OTHER PUBLICATIONS

Chan et al., "Advanced obfuscation techniques for Java bytecode", 2004, Elsevier, The Journal of Systems and Software 71, 1-10.*

* cited by examiner

*Primary Examiner* — Li B Zhen
*Assistant Examiner* — Sen Chen
(74) *Attorney, Agent, or Firm* — Birch, Stewart, Kolasch & Birch, LLP

(57) ABSTRACT

A system of one or more processors, method, and computer readable storage medium, by which a source program having at least one inner scope is processed by identifying variable names in the source program that are upward referencing and storing the upward referencing variable names with an identifier for the associated scope. A candidate shadow variable in a current scope of the source program is determined from variable names that are not among the identified upward referencing variable names. The determined candidate shadow variable is renamed to a variable name that is in an outer scope relative to the current scope. The source program is stored with the renamed variable. The stored source program can be compressed to a size smaller than the original source program in order to require less bandwidth during transmission over a network.

21 Claims, 3 Drawing Sheets

202
Compiler
Compiler Pass
Post Order Callback
Scope

204
Shadow Variables
attributes
URMap
Var-Name Usage
Compiler

206
Gather Reference Information
methods
visit – fill in URMap

208
Do Shadow Variables
methods
Enter Scope
exit Scope
visit
find Best Shadow
Do Shadow

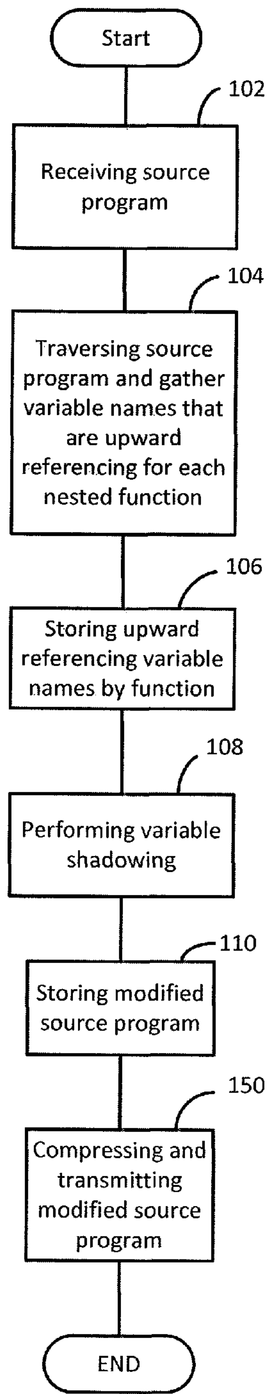
FIG. 1A
Start
102
Receiving source program
104
Traversing source program and gather variable names that are upward referencing for each nested function
106
Storing upward referencing variable names by function
108
Performing variable shadowing
110
Storing modified source program
150
Compressing and transmitting modified source program
END

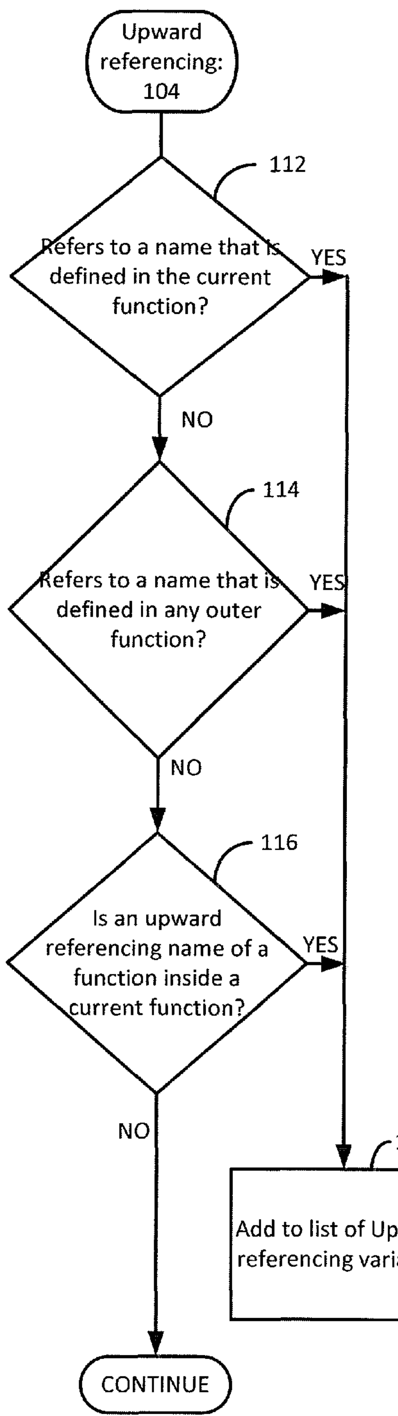
FIG. 1B
Upward referencing: 104
112
Refers to a name that is defined in the current function?
YES
NO
114
Refers to a name that is defined in any outer function?
YES
NO
116
Is an upward referencing name of a function inside a current function?
YES
NO
118
Add to list of Upward referencing variables
CONTINUE

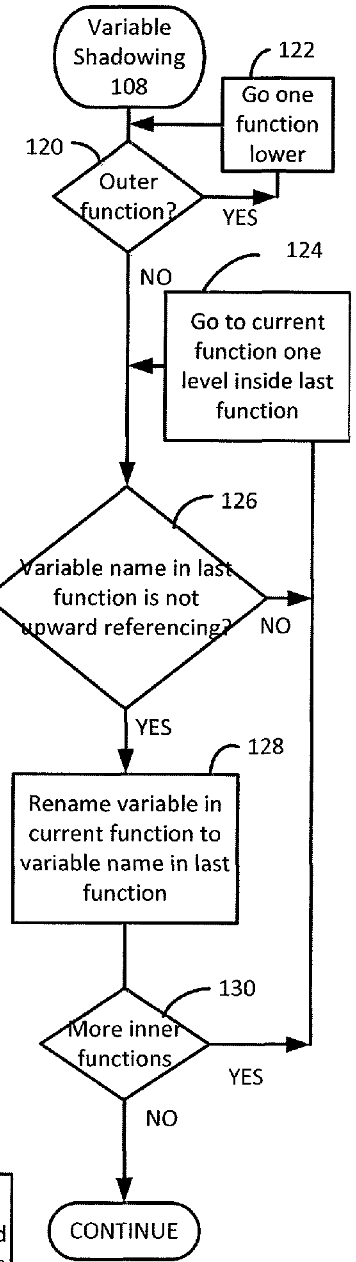
FIG. 1C
Variable Shadowing 108
122
Go one function lower
120
Outer function?
YES
NO
124
Go to current function one level inside last function
126
Variable name in last function is not upward referencing?
NO
YES
128
Rename variable in current function to variable name in last function
130
More inner functions
YES
NO
CONTINUE

INNER FUNCTION LOCAL VARIABLE NAME SHADOWING

TECHNICAL FIELD

The inventive concept relates to variable shadowing in source code having nested functions.

BACKGROUND

As code that is distributed over networks, such as the Internet, becomes more sophisticated, there becomes an increased need to reduce the size of the code as much as possible. For example, in the case of a JavaScript program served by a Web server, the compressed JavaScript should be made as small as possible in order to reduce latency and bandwidth cost when the compressed source code is transmitted.

BRIEF SUMMARY

This document describes a method performed by one or more processors, computer-readable storage medium, and system, in which a source program having at least one inner scope is received. Variable names in the source program that are upward referencing are identified and stored with an identifier for the associated scope. One or more candidate shadow variables are determined from variable names in the source program that are not among the identified upward referencing variable names. One of the one or more candidate shadow variables is selected and renamed to a name of a variable being shadowed. An aspect is storing the source program with the renamed variable. An aspect includes compressing the source program having the renamed variable and transmit the compressed source program over a network in order to reduce the amount of bandwidth needed to transmit the source program.

A further aspect is a source program that includes nested functions related such that a current inner function as the inner scope is nested within one or more outer functions as outer scopes relative to the inner scope. Variable names that are upward referencing include variables that reference a name that is defined in an associated current inner function or any of the one or more outer functions. Variable names that are upward referencing further include variable names that are upward referencing in a function that is nested inside the current inner function.

A further aspect is a source program that has multiple depths of nested inner functions relative to an outer function, and determining one or more candidate shadow variables is performed beginning at an inner function at a depth of one level within the outer function. The determining is repeated at a depth of one level within a previous inner function, until an innermost function is reached within the multiple depths of nested inner functions.

A further aspect is a source program in which there is more than one variable in an inner scope. A candidate shadow variable can be renamed to a variable name having the greatest number of occurrences among the more than one variable.

A further aspect is a source program in which there is more than one variable in an outer scope. A candidate shadow variable can be renamed to a variable name having the greatest number of occurrences among the more than one variable.

These and other aspects are described in detail with respect to the drawings. Other features, aspects, and advantages of the subject matter will become apparent from the description, the drawings, and the claims.

BRIEF DESCRIPTION OF THE DRAWINGS

The accompanying drawings constitute part of this specification. In the drawings, FIGS. 1A, 1B, 1C are a flowchart for an example operation of variable shadowing;

DETAILED DESCRIPTION

Figure 2:
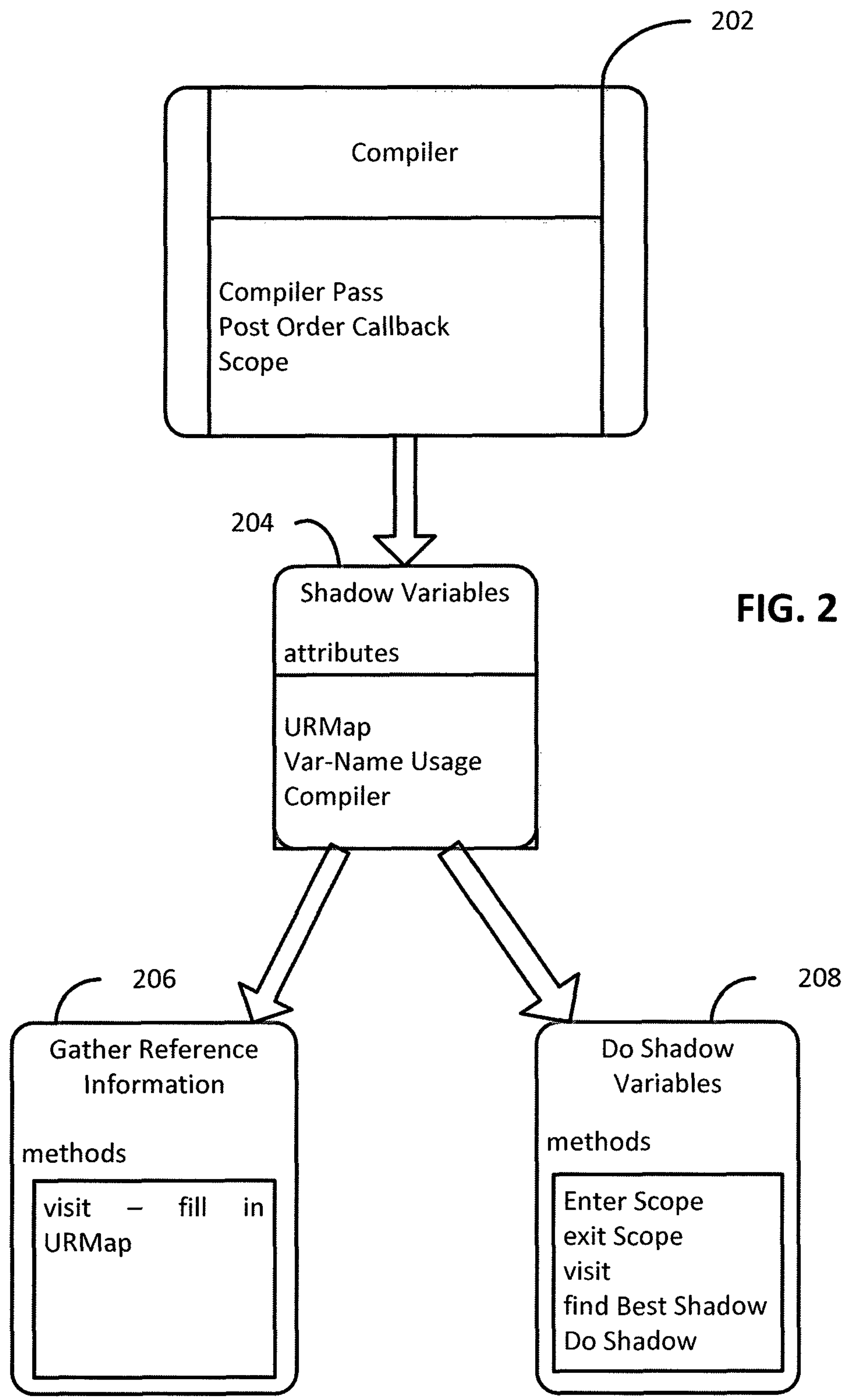
FIG. 2 is an example class diagram.

Although examples are in the JavaScipt language, it is understood that the disclosed variable shadowing applies to other programming languages that support nested functions. Also, the variable shadowing technique uses a scope analysis function of a conventional compiler. It is understood that scope analysis can be a stand-along program. In conventional program development, making a variable in an inner function a shadow variable (i.e., using the same name for each variable) of an outer function can lead to a program that is unreadable and confusing to a developer. Such practice is considered bad programming. However, it has been determined that in some cases, renaming variables to have the same name as another variable can reduce the size of the program when it is compressed (e.g., with GZIP or other text compression algorithms).

An approach to variable shadowing includes computing a list of "upward referencing" variable names for a function(s). As used herein, "upward referencing" refers to a variable name in an inner scope that references a variable name declared in an outer scope, which may be considered as "upward" in scope.

In the approach to variable shadowing, an "upward referencing" name (e.g., variable x) of a scope (function) is one in which 1) the name x is contained in the current scope (function) and refers to (or defines) a name that is defined in the current scope (function) or any outer scope (function).

2) the name x is an upward referencing name in a child scope (function) of the current scope (function). In other words, if a variable name is upward referencing in a child scope of the current scope, the variable name is considered as being upward referencing in the current scope, as well.

Provided a list of upward referencing names for each function, any variable name x in the current scope (function) can shadow a variable name y in an outer scope (function) given that name y is not an upward referencing name of the current scope (function).

Shadowing is performed beginning with an outermost level nested function, and working inward toward the innermost nested function, stepping one level at a time. This technique can make use of a "post-order traversal" function of a JavaScript compiler. Post-order traversal provides a capability of cascading a shadowed variable.

When an outer function has more than one variable that is a candidate name for shadowing, the variable name that has the most occurrences in that scope (function) is shadowed. This insures that a variable chosen for shadowing will increase in occurrences. In an example embodiment, when a compression algorithm (such as GZIP) starts to compress the program, it will assign a shorter Huffman encoding for the variable because it is used more frequently.

In a similar manner, when there are more than one variable in an inner function, the variable name that is chosen for shadowing is the one that has the greater number of occurrences in the inner function. If there is a tie between variables, variable names can be selected for shadowing based on alphabetical order.

FIGS. 1A, 1B, 1C are for a flowchart for an example operation of automatic variable shadowing. FIG. 1A shows the overall steps. FIG. 1B shows the step of gathering upward referencing names in more detail. FIG. 1C shows the step of automatic variable shadowing in more detail. As shown in FIG. 1A, at step 102, a source program is received. At step 104, the source program is traversed and variable names that are upward referencing for each nested function are gathered. At step 106, the gathered upward referencing variables are stored by their respective function. At step 108, for each upward referencing variable name, performing auto-variable shadowing. At step 110, the modified source program is stored. At step 150, the modified source program can be compressed by a compression component (e.g., GZIP or other compression algorithms) and transmitted by a transmission component to a client device for processing.

FIG. 1B shows step 104 in more detail. The steps in this flowchart produce a list of upward referencing variable names for each function. The flowchart indicates the conditions that define an upward referencing variable. In step 112, it is determined whether a variable name in a current scope (function) refers to a name that is defined in the current scope (function). If the variable does refer to a name that is defined in the current scope (function), the name of the variable is added to the list of upward referencing names for that scope (function), at step 118. In an embodiment of the shadowing technique, shadowing is limited to local variables. In step 114, it is determined whether a variable name in a current scope refers to a name that is defined in any outer scope (function), except variables of global scope. If the variable does refer to a name that is defined in any outer scope (function), the name of the variable is added to the list of upward referencing names for that current scope (function), at step 118. In step 116, it is determined whether a variable name in a current scope is an upward referencing name of a child scope (function) inside the current scope (function). If the variable is an upward referencing name of a child scope (function) inside the current scope, the name of the variable is added to the list of upward referencing names for the current scope (function).

FIG. 1C shows step 108 in more detail. For a variable name x in a current scope (function), a variable name y in an outer scope can be shadowed given that name y is not an upward referencing name in the current scope. The flowchart in FIG. 1C shows steps in automatic variable shadowing based on this shadow principal. The steps begin at the outermost scope and work inward in a nested hierarchy of scope (function) in a source program. At step 120, it is determined whether the scope (function) is an outer function. If the scope (function) is the outer scope (function), the process moves one scope (function) level lower, at step 122. At step 126, when the current scope is a level below the outer scope (function), it is determined whether a variable name in the last scope (function) is not upward referencing.

In the case that the variable name in the last scope (function) is not upward referencing, at step 128, the variable name in the current scope (function) is renamed to the variable name in the last scope (function). As mentioned above, when there is more than one variable in an outer scope (function) that are candidates for shadowing, shadowing is performed for the variable that has the greatest number of occurrences in all scopes (functions). Doing so will increase the number of occurrences of a variable name in the source program.

For example, at step 128 when the outer (last) scope (function) has more than one variable, the variable name in the outer function that has the greatest number occurrences is used to rename the variable in the current scope (function).

In an alternative case, when there is more than one variable in a current scope, the variable name in the current scope that has the greatest number of occurrences is renamed to a name in the outer scope.

At step 130, the steps are repeated if there are more inner functions.

Illustrative Examples

The following example is an example of automatic variable shadowing.

The initial source code is:

```
function outer( ){
  var y;
  function inner( ){
  var x;
  }
}
```

Since y is not in the upward referencing set in the inner( ) function, shadowing can be performed to rename x to y.

After the automatic variable shadowing, the resulting source code is:

```
function outer ( ) {
  var y;
  function inner ( ){
  var y;
  }
}
```

The next example is an example of upward referencing names, as would be performed using steps in FIG. 1B:

```
var x;
var y;
function foo(a) {
  function bar (b) {
  print(x);
  print(a);
  }
}
```

The upward referencing names in scope 'foo' is function 'bar' and variables b, x, a.

The next example is an example of post order traversal, a function of a compiler, as would be performed using steps in FIG. 1C:

```
function f1(v1) {
  function f2(v2) {
  function f3(v3) {
  }
  }
  }
}
```

First shadowing is performed in nested function f2 to rename v2 to v1

Next, shadowing is performed in nested function f3 to rename v3 to v1

If shadowing were not performed in this post order fashion, v2 would not be renamed to v1.

The next examples provide alternative cases for step 128 of FIG. 1C, in which shadowing is performed in order of variables with the most occurrences.

The next example is for multiple occurrences of outer variables.

```
var x;
print(x);
print(x);
var y;
print(y);
function foo( ){var a}
```

In this case, variable x, having the greater number of occurrences, is chosen for shadowing because it will further increase the number of x's in the source code. In the example, variable a will be renamed to x.

The next example is for multiple occurrences of inner variables.

```
var x;
print(x);
function( ){
  var a,
  print(a,a,a,a,a,a),
  var b}
```

In this case, a's are renamed to x's to increase the number of x's.

Example Implementation

FIG. 2 shows an embodiment in terms of example classes. In the example embodiment, the automatic variable shadowing technique can use functions of a JavaScript compiler. In the example embodiment, the automatic variable shadowing technique can include a Post Order Callback library module, Scoped Callback library module, and a variable Scope library module that are modules for the compiler 202. Using functions from these modules of the JavaScript compiler, a list of variables are computed that can shadow a variable in the outer scope.

In the example embodiment, a class Shadow Variables 204 keeps a map of Upward Referencing name nodes of each scope (URMap).

When a Shadow Variables object is constructed, it maintains parameters, including assignments, variables by frequency (VbyFreq), and Name Map. The parameter "assignments" is a map of old variable names to its assignment Objects. The parameter "VbyFreq" is variable assignments sorted by frequency. The parameter Name Map is the current name map that is updated.

In the example embodiment, the shadowing technique is divided into two stages:

1. Information gathering (variable usage, upward referencing)

2. Finding shadows for each variable; updates a variable usage frequency map.

In the example embodiment, the shadowing technique is performed using a Gather Reference Information class 206 and a Do Shadow Variables class 208. The class Gather Reference Information 206 uses Post Order Callback and focuses on shadowing local variables as their name occurs much more than global names. The class uses the definition of upward referencing to fill in the URMap. The class fills in the usage map that tracks a variable and all of its usage.

The class Do Shadow Variables 208 uses Post Order Callback and Scoped Callback of the Compiler. A method in Do Shadow Variables looks for the best shadow for the current candidate. The method only shadows if this increases the number of occurrences of the shadowed variable.

For example, if variable L7 is going to be renamed to L1, by definition of upward referencing, the name L1 is entered in the set of upward referencing names of the current scope up to the declaring scope of the best shadow variable.

Computer Implementation

Figure 3:
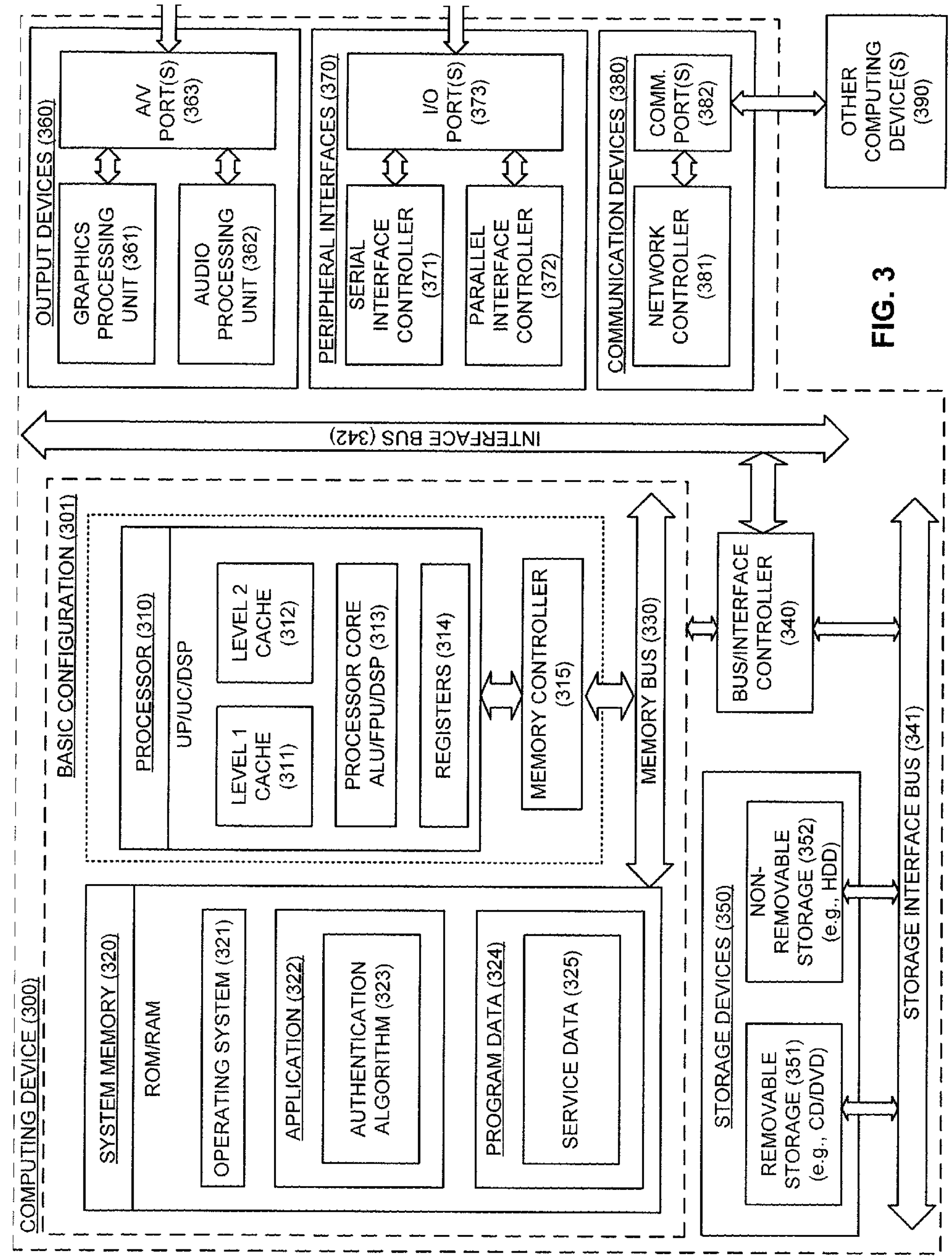
FIG. 3 is an example computer configuration for performing variable shadowing.

FIG. 3 is a block diagram illustrating an example computing device 300 that is arranged for automatic variable name shadowing in accordance with the present disclosure. In a very basic configuration 301, computing device 300 typically includes one or more processors 310 and system memory 320. A memory bus 330 can be used for communicating between the processor 310 and the system memory 320.

Depending on the desired configuration, processor 310 can be of any type including but not limited to a microprocessor (μP), a microcontroller (μC), a digital signal processor (DSP), or any combination thereof. Processor 310 can include one more levels of caching, such as a level one cache 311 and a level two cache 312, a processor core 313, and registers 314. The processor core 313 can include an arithmetic logic unit (ALU), a floating point unit (FPU), a digital signal processing core (DSP Core), or any combination thereof. A memory controller 315 can also be used with the processor 310, or in some implementations the memory controller 315 can be an internal part of the processor 310.

Depending on the desired configuration, the system memory 320 can be of any type including but not limited to volatile memory (such as RAM), non-volatile memory (such as ROM, flash memory, etc.) or any combination thereof. System memory 320 typically includes an operating system 321, one or more applications 322, and program data 324. Application 322 includes an automatic variable name shadowing processing algorithm 323. Program Data 324 includes classes 325, as described above. In some embodiments, application 322 can be arranged to operate with program data 324 on an operating system 321. This described basic configuration is illustrated in FIG. 3 by those components within dashed line 301.

Computing device 300 can have additional features or functionality, and additional interfaces to facilitate communications between the basic configuration 301 and any required devices and interfaces. For example, a bus/interface controller 340 can be used to facilitate communications between the basic configuration 301 and one or more data storage devices 350 via a storage interface bus 341. The data storage devices 350 can be removable storage devices 351, non-removable storage devices 352, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media can include volatile and nonvolatile, removable and non-removable media implemented in any method or technology for storage of information, such as computer readable instructions, data structures, program modules, or other data.

System memory 320, removable storage 351 and non-removable storage 352 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 300. Any such computer storage media can be part of device 300.

Computing device 300 can also include an interface bus 342 for facilitating communication from various interface devices (e.g., output interfaces, peripheral interfaces, and communication interfaces) to the basic configuration 301 via the bus/interface controller 340. Example output devices 360 include a graphics processing unit 361 and an audio processing unit 362, which can be configured to communicate to various external devices such as a display or speakers via one or more A/V ports 363. Example peripheral interfaces 370 include a serial interface controller 371 or a parallel interface controller 372, which can be configured to communicate with external devices such as input devices (e.g., keyboard, mouse, pen, voice input device, touch input device, etc.) or other peripheral devices (e.g., printer, scanner, etc.) via one or more I/O ports 373. An example communication device 380 includes a network controller 381, which can be arranged to facilitate communications with one or more other computing devices 390 over a network communication via one or more communication ports 382. The communication connection is one example of a communication media. Communication media may typically be embodied by computer readable instructions, data structures, program modules, or other data in a modulated data signal, such as a carrier wave or other transport mechanism, and includes any information delivery media. A "modulated data signal" can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared (IR) and other wireless media. The term computer readable media as used herein can include both storage media and communication media.

Computing device 300 can be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 300 can also be implemented as a personal computer including both laptop computer and non-laptop computer configurations.

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method performed by one or more processors, comprising:

receiving a source program having at least one first function nested within a second function such that the first function is associated with an inner scope and the second function is associated with an outer scope relative to the inner scope;

identifying variable names in the source program that are upward referencing by identifying variables that reference names defined in the inner scope;

storing the upward referencing variable names with an identifier for the associated scope;

determining one or more candidate shadow variables from variable names in the source program that are not among the identified upward referencing variable names;

renaming, within the source program, one of the candidate shadow variables to a particular variable name selected from among the upward referencing variable names in response to an increase in a number of occurrences of that particular variable name within the source program;

storing the source program with the renamed candidate shadow variable.

2. The method of claim 1, wherein the source program includes two or more nested functions related such that a current inner function as the inner scope is nested within one or more outer functions as outer scopes relative to the inner scope, wherein the identifying variable names that are upward referencing includes identifying variables that references a name that is defined in an associated current inner function or any of the one or more outer functions.

3. The method of claim 2, wherein the identifying variable names that are upward referencing further includes identifying variable names as being upward referencing in a function that is nested inside the current inner function.

4. The method of claim 2, wherein there are multiple depths of nested inner functions relative to an outer function, and the step of determining one or more candidate shadow variables is performed beginning at an inner function at a depth of one level within the outer function, and repeating the determining step at a depth of one level within a previous inner function, until an innermost function is reached within the multiple depths of nested inner functions.

5. The method of claim 1, wherein when there is more than one variable in an inner scope, the renaming renames a candidate shadow variable to a variable name having the greatest number of occurrences among the more than one variable.

6. The method of claim 1, wherein when there is more than one variable in an outer scope, the renaming renames a candidate shadow variable to a variable name having the greatest number of occurrences among the more than one variable.

7. A non-transitory computer-readable storage medium storing program instructions that, when executed by a computer perform steps comprising:

receiving a source program having at least one first function nested within a second function such that the first function is associated with an inner scope and the second function is associated with an outer scope relative to the inner scope;

identifying variable names in the source program that are upward referencing by identifying variables that reference names defined in the inner scope;

storing the upward referencing variable names with an identifier for the associated scope;

determining one or more candidate shadow variables from variable names in the source program that are not among the identified upward referencing variable names;

renaming, within the source program, one of the candidate shadow variables to a particular variable name selected from among the upward referencing variable names in response to an increase in a number of occurrences of that particular variable name within the source program;

storing the source program with the renamed candidate shadow variable.

8. The non-transitory computer-readable storage medium of claim 7, wherein the source program includes nested functions related such that a current inner function as the inner scope is nested within one or more outer functions as outer scopes relative to the inner scope, wherein the identifying variable names that are upward referencing includes identifying variables that references a name that is defined in an associated current inner function or any of the one or more outer functions.

9. The non-transitory computer-readable storage medium of claim 8, wherein the identifying variable names that are upward referencing further includes identifying variable names as being upward referencing in a function that is nested inside the current inner function.

10. The non-transitory computer-readable storage medium of claim 8, wherein there are multiple depths of nested inner functions relative to an outer function, and the step of determining one or more candidate shadow variables is performed beginning at an inner function at a depth of one level within the outer function, and repeating the determining step at a depth of one level within a previous inner function, until an innermost function is reached within the multiple depths of nested inner functions.

11. The non-transitory computer-readable storage medium of claim 7, wherein when there is more than one variable in an inner scope, the renaming renames a candidate shadow variable to a variable name having the greatest number of occurrences among the more than one variable.

12. The non-transitory computer-readable storage medium of claim 7, wherein when there is more than one variable in an outer scope, the renaming renames a candidate shadow variable to a variable name having the greatest number of occurrences among the more than one variable.

13. A system comprising:

one or more processors;

a computer-readable medium coupled to the one or more processors having instructions stored thereon that, when executed by the one or more processors, cause the one or more processors to perform the instructions, the instructions comprising:

a shadow variables component;

a reference information gathering component; and a renaming component, when executing the instructions, the one or more processors perform shadowing operations on a source program having at least one first function nested within a second function such that the first function is associated with an inner scope and the second function is associated with an outer scope relative to the inner scope, including that, when executing the shadow variables component, the one or more processors:

creating a shadow variables object that maintains in a memory changes to a variable name map, when executing the referencing information gathering component, the one or more processors:

creating a referencing information gathering object using the reference information gathering component, the referencing information gathering object:

performing information gathering, including identifying one or more variable names that are upward referencing in the nested inner scope, and storing the identified one or more upward referencing variable names with an identifier for the scope associated with said identified one or more upward referencing variable names in said variable name map, and when executing the renaming component, the one or more processors:

creating a renaming object using the renaming component, the renaming object:

performing shadow variable renaming, including identifying one or more candidate shadow variables in the source program based on the variable names identified as upward referencing such that the candidate shadow variables do not include said identified one or more upward referencing variable names, renaming, within the source program, one of the identified candidate shadow variables to one of said identified one or more upward referencing variable names in response to an increase in a number of occurrences of that one of said identified one or more upward referencing variable names within the source program, and storing the source program including the renamed variable.

14. The system of claim 13, wherein the source program includes two or more nested functions related such that a current inner function as the inner scope is nested within one or more outer functions as outer scopes relative to the inner scope, wherein the identifying variable names that are upward referencing includes identifying a variable that references a name that is defined in an the current inner function or any of the one or more outer functions.

15. The system of claim 14, wherein the identifying variable names that are upward referencing further includes determining that a variable name has been identified as upward referencing in a function that is nested inside the current inner function.

16. The system of claim 14, wherein there are multiple depths of nested inner functions relative to an outer function, and the step of performing shadow variable renaming is performed beginning at an inner function at a depth of one level within the outer function, and repeating the renaming step at a depth of one level within a previous inner function, until an innermost function is reached within the multiple depths of nested inner functions.

17. The system of claim 13, wherein when there is more than one variable in an inner scope, the renaming renames a candidate shadow variable to a variable name having the greatest number of occurrences among the more than one variable.

18. The system of claim 13, wherein when there is more than one variable in an outer scope, the renaming renames a candidate shadow variable to a variable name having the greatest number of occurrences among the more than one variable.

19. The system of claim 13, further comprising a compression component and a transmission component, wherein the compression component compressing the source program having the renamed variable and the transmission component transmitting the compressed source program over a network.

20. The method of claim 1, the step of storing including compressing the source program with the renamed variable using a compression scheme, where a data size of the compressed source program with the renamed variable is smaller than a data size of the received source program compressed with the compression scheme.

21. The method of claim 1, the method further comprising compiling the source program with the renamed variable using a compiler, where a data size of the compiled source program with the renamed variable is smaller than a data size of the received source program compiled with the compiler.

* * * * *